United States Patent [19]
Wiegelmann

[11] 3,837,538
[45] Sept. 24, 1974

[54] DISTRIBUTING AND PROPORTIONING DEVICE FOR FERTILIZERS, SEED AND OTHER SPREADABLE PRODUCTS, PARTICULARLY FOR AGRICULTURAL PURPOSES

[75] Inventor: Hubert Wiegelmann, Bielefeld, Germany

[73] Assignee: Kuxmann KG, Bielefeld, Germany

[22] Filed: May 10, 1973

[21] Appl. No.: 358,886

[30] Foreign Application Priority Data
May 25, 1972 Germany............................. 2225347

[52] U.S. Cl.................................. 222/178, 239/664
[51] Int. Cl............................................. A01c 19/00
[58] Field of Search ........... 222/176, 177, 178, 182, 222/290, 408, 409, 353, 371, 415, 55, 217; 239/664, 672; 198/193, 202

[56] References Cited
UNITED STATES PATENTS

| | | | |
|---|---|---|---|
| 2,416,898 | 3/1947 | Breeze............................ | 239/664 X |
| 2,500,681 | 3/1950 | Hoffstetter......................... | 239/664 |
| 2,538,961 | 1/1951 | Biszantz et al..................... | 239/664 |
| 3,259,278 | 7/1966 | Barber et al........................ | 222/178 |

FOREIGN PATENTS OR APPLICATIONS

| | | | |
|---|---|---|---|
| 697,915 | 11/1930 | France................................. | 222/178 |
| 822,920 | 11/1951 | Germany............................ | 222/178 |

*Primary Examiner*—Robert B. Reeves
*Assistant Examiner*—Charles A. Marmor
*Attorney, Agent, or Firm*—James E. Nilles

[57] ABSTRACT

A distributing and proportioning device for spreadable products that consists of a mobile container and one or two outrigger channels which are positioned with its inner ends under outlet unions of the container and extending transversely to the direction of travel and provided with oblong distributing slots. A substantially plane conveyor belt is running endlessly around horizontal axes above the bottom of the outrigger channels which carries the products fed from the container by friction resistance to the outer ends of the channels which thus are wholly filled. Distributing fingers mounted at the belts spread the products through the distributing slots in an amount dependent on the peripheral speed of the belts or of the vertical distance of the slots.

6 Claims, 4 Drawing Figures

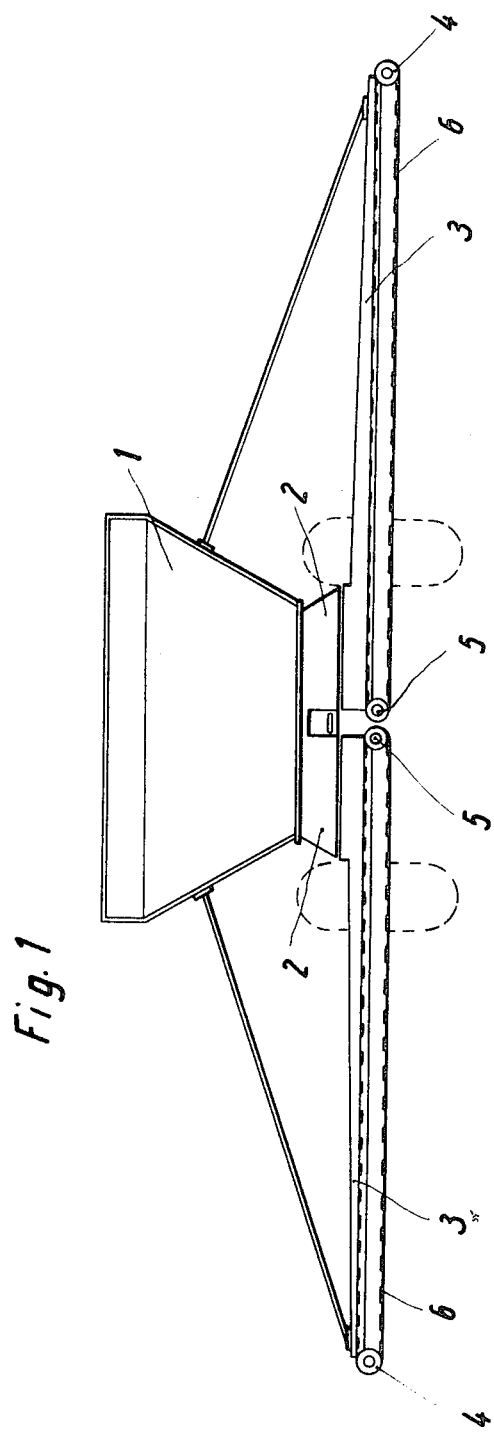

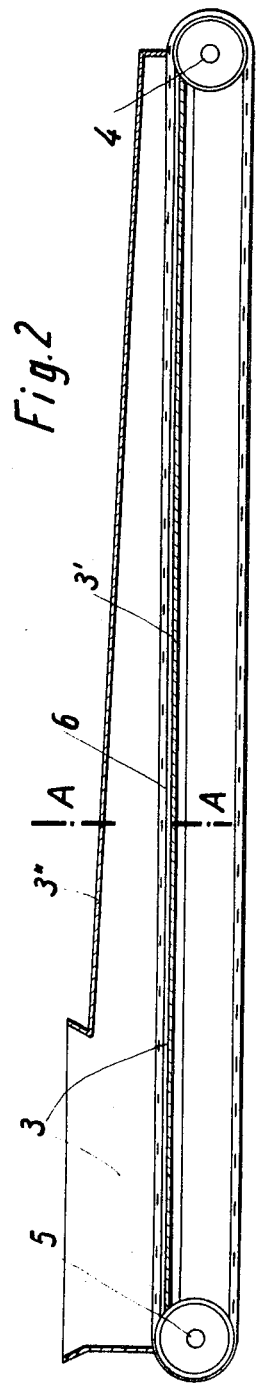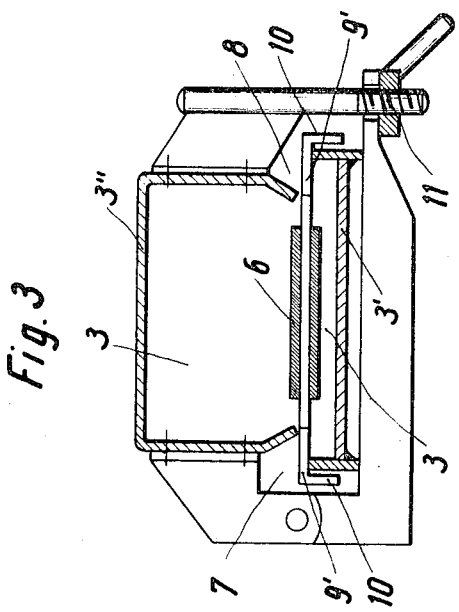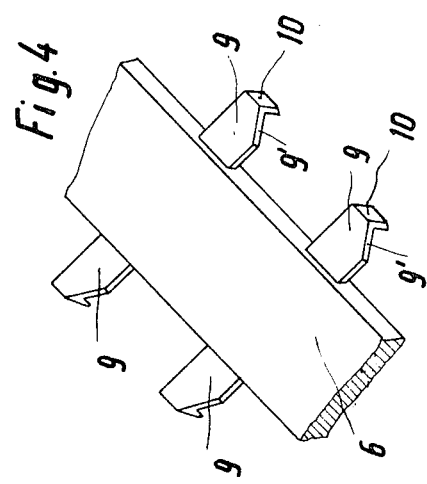

3,837,538

DISTRIBUTING AND PROPORTIONING DEVICE FOR FERTILIZERS, SEED AND OTHER SPREADABLE PRODUCTS, PARTICULARLY FOR AGRICULTURAL PURPOSES

BACKGROUND OF THE INVENTION

1. Field of the Invention

The invention relates to a distributing and proportioning or metering device for fertilizers, seed, agents for destroying weed and other spreadable products which are fed from a supply container to one or more outrigger arms enclosing delivery elements and being designed in the form of hollow carriers with spreading openings.

2. Description of the Prior Art

Fertilizer spreading and sowing machines having a mobile large-capacity supply container for the products being spread have been known in agricultural engineering for many decades. Under the outlet openings of said machines there are outrigger arms which extend across a relatively large width transversely to the direction of travel and can be swivelled into the direction of travel for road transport. These arms are designed in the form of hollow carriers with spreading openings, enclose delivery elements for the products conveyed to them from the supply container and are designed to distribute the products conveyed to them across a relatively large width transversely to the direction of travel. As a rule, the delivery elements used in the conventional machines of this type inside the outrigger arms normally consisting of tubes take the form of screw conveyors which are designed to convey the products in the outrigger arms along the spreading openings thereof as far as the outer ends of the outrigger arms.

In another known machine this type the delivery elements moving inside the outrigger arms having slot-shaped spreading openings consist of endless chains running around horizontal axes with spatially consecutive, spade-shaped delivery bars which are designed to push the products conveyed from the outlet openings of the supply container along the outrigger arms in the outward direction to the spreading slots.

It is also known to convey the products conveyed from the outlet openings of the supply container to outrigger arms open on the topside in the outward direction by means of endless belts or chains running around vertical axes and equipped with delivery bars and to carry out the spreading process by spreading shafts rotating above the compartments formed by the delivery bars, said shafts being equipped with spreading fingers, brushes or the like and depositing the products moved respectively between the delivery bars in the outward direction.

In all these known fertilizer distributing and sowing machines the devices moving in the outrigger arms serve solely to compulsorily convey the products delivered to them on the inlet side from the supply container along the outrigger arms to the spreading openings as far as the outer end of the outrigger arms. These delivery elements do not have a metering or proportioning action. The proportioning of the products to be spread is rather designed to be achieved by special proportioning devices interposed between the outlet openings of the supply container and the inlet openings of the outrigger arms, which devices regulate the flow of the products from the supply container to the outrigger arms. Consequently, the delivery elements can only pick up that amount which is conveyed to them at the inlet opening of the outrigger arms from the supply container by means of the interposed proportioning device. During delivery to the outer end of the outrigger arms, however, that spreading amount is reduced by the extent to which partial amounts have dropped through the spreading openings of the outrigger arms along the delivery path; this is a circumstance which leads to irregular proportioning and distribution of the products along the entire length of the outrigger arms.

Satisfactory results have not been obtained either in an attempt to make use of the spreading finger chain which provides in broad-box fertilizer spreaders for uniform proportioning and distribution of the products across relatively large working widths. This attempt consisted in mounting delivery bars on the spreading fingers as a delivery element inside an outrigger arm which was mounted under the mobile supply container, supplied with the products from said container and designed in the form of a hollow carrier with spreading slots. For here, too, the product quantity conveyed to the outrigger arms from the supply container is continuously reduced along the delivery path through the outrigger arms by the amount of the partial quantities spread by the spreading fingers along said delivery path, and this in turn leads to irregular proportioning and distribution of the products along the entire length of the outrigger arms.

Over and above that, uniform proportioning and distribution of the products along the entire length of the outrigger arms is also impeded in the machines in question by the fact that the screw threads or delivery bars of the known delivery elements as well as the delivery bars mounted on the spreading fingers of a spreading finger chain exert a pressing action varying the spreading volume on the products conveyed compulsorily inside the outrigger arms.

SUMMARY

An object of this invention is to remedy all these defects. The invention proceeds from the finding that the uniformly proportioned distribution and spreading of the products conveyed along an outrigger channel to spreading slots is possible only if the delivery element fills the outrigger channel uniformly with products along its entire length and also keeps it permanently full during the spreading process without exerting a pressing action on the products.

According to the invention such a delivery element which simultaneously assumes the spreading and proportioning functions takes the form of a substantially plane conveyor belt running endlessly around horizontal axes and passing with its conveying section which has no delivery members on its upper side through the outrigger channel above its bottom. The longitudinal edges of said belt or one edge thereof are furnished with scattering or distributing elements (spreading fingers) passing through oblong slots of adjustable height of the outrigger channel. This substantially plane conveyor belt, to which the products are fed from the supply container through an inlet funnel situated on the outrigger channel at the inlet point of the belt, conveys the products carried to it into the outrigger channel as far as the latter's outer terminating wall without exerting a damaging pressure thanks to the delivery capacity based merely on the friction resistance between the products and belt, and thus fills the outrigger channel completely with the products. When the outrigger channel is completely full, the plane conveyor belt feeds only as much of the product flowing to it at the inlet point into the outrigger channel as is distributed by the distributing elements (spreading fingers) on its edges through the lateral spreading slots of the outrigger channel. It thus keeps the outrigger channel permanently full during the spreading process and there is a continuous process in which a constant relationship also sets in between the speed of movement of the products transported by the conveyor belt inside the outrigger channel and the speed of movement of the product quantities distributed by the scattering elements (spreading fingers) through the spreading slots along the outrigger channel, this constant relationship being absolutely essential for the uniform proportioning and distribution of the products along the entire length of the outrigger channel.

As far as the function of the spreading and proportioning device designed in accordance with the invention is concerned, it is essential that the delivery capacity of the conveyor belt is greater than the spreading capacity of the distributing elements (spreading fingers). This can be safeguarded by observing an appropriate relationship between the width of the conveyor belt and the length the effective spreading edges of the scattering elements (spreading fingers).

In order to accelerate the filling of the outrigger channel at the beginning of work, the outrigger channel can have a cross section which decreases steadily from the outlet opening of the supply container towards its outer end at a certain level above the conveyor belt, that is, a wedge-shaped longitudinal section.

DESCRIPTION OF THE DRAWINGS

FIG. 1 shows a rear view of a mobile product supply container with two spreading and proportioning devices according to the invention mounted under the container's outlet openings and facing each other transversely to the direction of travel, FIG. 2 is a longitudinal section of one of the spreading and proportioning devices, FIG. 3 is a cross section according to line A—A from FIG. 2 and FIG. 4 is a top view of a part of the conveying and proportioning element effective inside the spreading and proportioning device, shown perspectively.

DESCRIPTION OF THE PREFERRED EMBODIMENT

In FIG. 1 of the drawings, numeral 1 denotes a mobile large-capacity supply container which is customary in agricultural engineering for spreading products and the side walls of which converge towards the bottom. The bottom of said container is equipped with two funnel-shaped outlet unions 2 which are arranged adjacent to each other transversely to the direction of travel and to which the products can be fed continuously through screw conveyors or the like rotating inside supply container 1. Under each of said outlet funnels 2 there is one outrigger arm or channel 3 which extends transversely to the direction of travel, is designed in the form of a hollow carrier with spreading openings and encloses delivery elements. Said arms or channels 3 can be swivelled into the direction of travel of the supply container 1. These outrigger arms or channels 3 are designed to scatter in uniformly distributed and proportionable amounts the products flowing to them from supply container 1 continuously along their entire length. The delivery and proportioning element which acts inside the outrigger channel 3 formed from a groove-shaped bottom part 3' and a roof-shaped top part 3'' serves this purpose. According to the invention said element consists of a plane conveyor belt 6 running endlessly around horizontal axes 4,5 and passing with its conveying section through outrigger channel 3 above the latter's bottom 3'. Said belt 6 is furnished along its longitudinal edges or one of them with scattering elements (spreading fingers) 9 passing through oblong slots 7 and/or 8 of adjustable height of outrigger channel 3. Here, the width of conveyor belt 6 has to bear such a relationship to the effective spreading edges 9' provided at the front side of scattering elements 9 that the delivery capacity of the conveyor belt is greater than the spreading capacity of the scattering elements. In order to provide for secure longitudinal guidance of conveyor belt 6 inside outrigger channel 3, the scattering elements 9' of the conveyor belt can be guided at the border edges of the outrigger arm's bottom part 3' by bends 10 or similarly acting engaging means (FIG. 3). It is appropriate to design the downward pointing side walls of the outrigger arm's top part 3'' so that they converge in their lower section towards the longitudinal centre line of outrigger arm 3 (FIG. 3) in order to prevent the products from trickling out of spreading slots 7,8 of outrigger channel 3. To proportion variably the product quantities distributed and scattered uniformly along the entire length of outrigger channel 3 by the delivery and proportioning element 6,9 designed in accordance with the invention, use is made of the conventional shift-gear mechanism to control the peripheral speed of conveyor belt 6 and of suitable setting devices 11 to regulate the vertical distance between the top part 3'' and bottom part 3' of outrigger arm 3 (slot adjustment).

The spreading and proportioning or metering device designed in accordance with the invention can also be employed for purposes other than the ones given here. For example, it could be suitable for filling uniformly and proportionably the fodder boxes of long fodder plants for poultry or the like with a stationary arrangement which is stopped and started periodically as a function of time, and for the uniform scattering of spreadable top layers for road building and the uniform spreading of winter protective agents in the case of a mobile arrangement. At all events, the thing essential to the idea of the invention is the uniform and proportional distribution and scattering of spreadable products according to the invention from a large-capacity supply container across relatively large and very large spreading widths by maintaining the channel 3 permanently filled above the top run of the substantially plane conveyor belt which conveys the products by friction resistance. The uniform distribution without pressing the spreadable products gives the possibility also to spread insecticides and herbicides which, as is well known, must be distributed only in small quantities which is achieved by a small peripheral speed of the belts or by reducing the vertical distance of the distributing slots.

The machine may be used with a single outrigger arm thus conveying the products laterally only to one side, or, when used with a double outrigger arm as shown in FIG. 1, one of the outlet unions of the supply container may be shut off, and the not-used outrigger arm may be swivelled into the direction of travel.

What claimed is:

1. A spreading and proportioning device for fertilizers, seed or other spreadable products comprising, a supply container, a laterally extending outrigger arm for receiving said products from said container and terminating in a free end, said arm formed as a hollow carrier having a top part and also a bottom part, means for adjustably mounting said bottom part to said top part to define a longitudinal slot therebetween which thereby forms an adjustable discharge opening, a flat endless conveyor belt having a flight enclosed by said arm and movable around horizontal axes to feed products toward the free end of said arm, and delivery elements including distributing fingers which are secured to a longitudinal edge of said belt and which pass through said slot of the outrigger arm, said top part having opposed side walls including lower sections which inwardly converge toward one another, and said fingers extend laterally beyond said lower sections.

2. The invention according to claim 1, wherein the relationship between the width of the conveyor belt and the length of the effective spreading edges of the distributing fingers is such that the delivery capacity of the conveyor belt is greater than the spreading capacity of the distributing fingers.

3. The invention according to claim 1 wherein the outrigger arm consists of a groove-shaped bottom part with upward pointing border edges and a roof-shaped top part with downward pointing side walls.

4. The invention according to claim 3, wherein the vertical distance between the top part and bottom part of the outrigger arm can be regulated.

5. The invention according to claim 3 wherein the distributing fingers of the conveyor belt have engaging means which are guided by the outrigger arm's bottom part.

6. The invention according to claim 1 wherein the outrigger arm has a steadily decreasing cross section from the supply container towards the free end of said arm and above the conveyor belt.

* * * * *